United States Patent [19]

Johnson

[11] Patent Number: 4,472,987

[45] Date of Patent: Sep. 25, 1984

[54] WORKPIECE FEED DEVICE FOR LATHES

[75] Inventor: Alton B. Johnson, Ashville, N.Y.

[73] Assignee: TRW Inc., Cleveland, Ohio

[21] Appl. No.: 252,498

[22] Filed: Apr. 8, 1981

[51] Int. Cl.³ .............................................. B23B 13/00
[52] U.S. Cl. ........................................ 82/2.5; 414/14; 414/18
[58] Field of Search ....................... 82/38 R, 38 A, 2.5, 82/2.7; 414/14, 15, 17, 18, 20

[56] References Cited

U.S. PATENT DOCUMENTS

| | | | |
|---|---|---|---|
| 3,493,125 | 2/1970 | White et al. | 414/15 |
| 3,696,696 | 10/1972 | Bechler | 82/2.5 |
| 4,068,545 | 1/1978 | Scheler | 82/2.7 |
| 4,295,396 | 10/1981 | Hasslauer | 82/2.5 |

Primary Examiner—Robert E. Garrett
Assistant Examiner—Jerry Kearns
Attorney, Agent, or Firm—Daniel G. Blackhurst

[57] ABSTRACT

A workpiece feed device for lathes wherein an elongated workpiece is supported solely at the opposed end areas thereof. The workpiece extends through the lathe spindle feed opening with one end being clampingly engaged thereat and the other end being supported by a workpiece pusher. This pusher is selectively movable by drive means linearly along a workpath so as to sequentially feed the workpiece into the lathe. The pusher is supported by a plurality of roller sets so that it may freely rotate coaxially about the workpath and the roller sets are positioned in a generally surrounding relationship with the pusher so that any lateral pusher movement relative to the workpath is substantially limited or eliminated. Also, the roller sets and pusher are dimensioned to cooperate with each other at some predetermined radial distance from the workpath so that the workpiece is supported over its length solely at the opposite end areas thereof. The pusher is receivable in the lathe spindle opening to complete a workpiece feeding operation.

8 Claims, 3 Drawing Figures

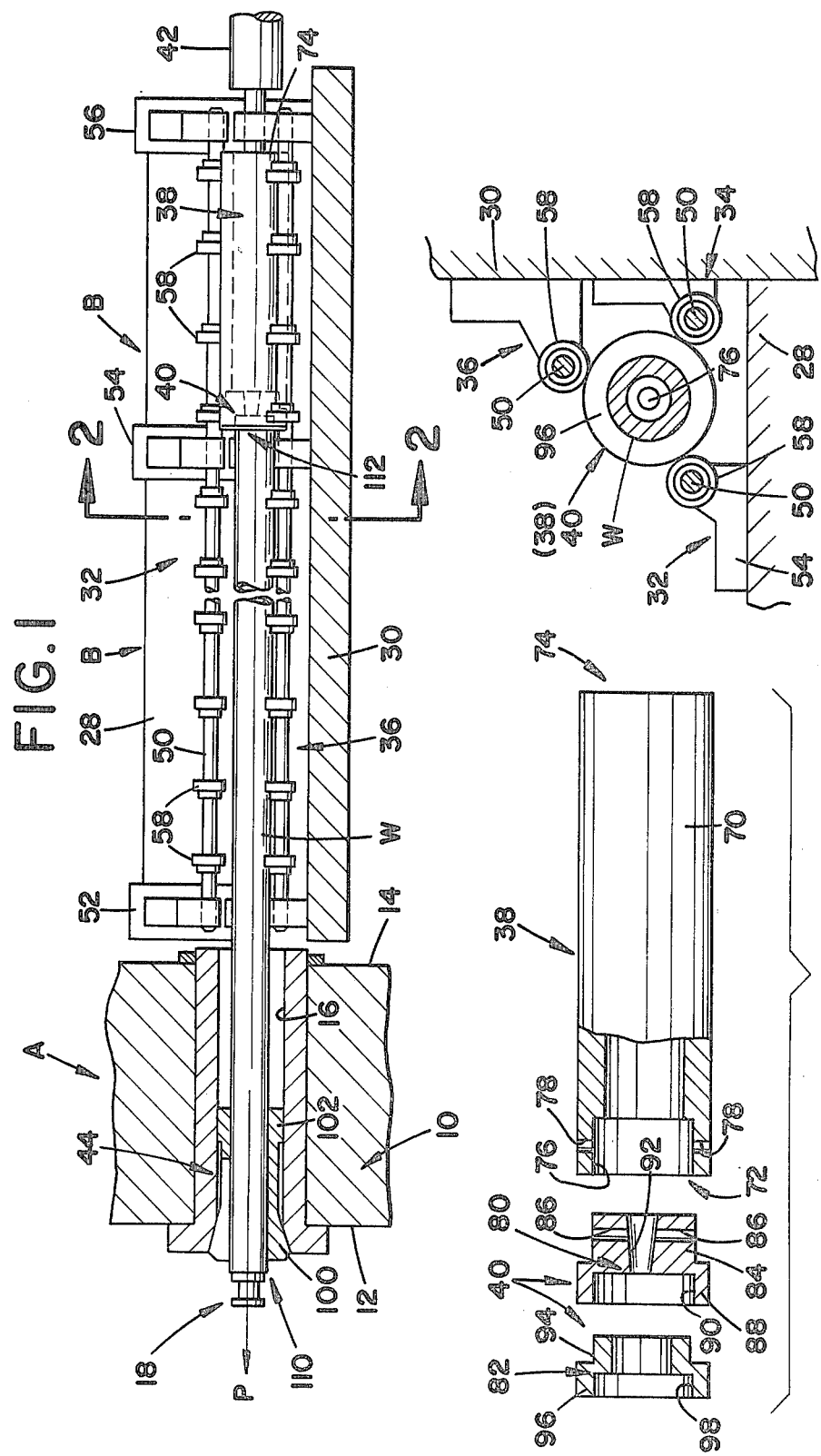

WORKPIECE FEED DEVICE FOR LATHES

BACKGROUND OF THE INVENTION

This invention pertains to the art of feeding devices and more particularly to feeding devices for elongated workpieces.

The invention is particularly applicable to a feeding device for sequentially advancing an elongated workpiece along some predetermined workpath into work communication with a lathe or turning apparatus and will be described with particular reference thereto. However, it will be readily appreciated by those skilled in the art that the invention has broader applications and may be adapted to use in other work or machining environments.

So-called bar feed apparatus for selectively and sequentially advancing elongated workpieces into work communication with lathes or turning machines are known in the art. However, existing ones of these apparatus have had various drawbacks in design, construction or operation which have resulted in less than optimum feed or operational characteristics.

For example, existing bar feed devices have typically required a series of rings or spacers located in the lathe spindle to center and contain the workpiece while being turned in the lathe. These rings or spacers must be changed to accommodate various workpiece diameters and often become lodged in the spindle to thereby render changeover from one ring size to another extremely difficult and time consuming. The rings also unduly restrict processing workpieces having more than some predetermined amount of bow over the lengths thereof and thus require a preliminary step of cutting the workpieces into shorter lengths. This preliminary step causes a loss in production time, increases labor costs and produces two "stub" ends which increase material costs.

It has, therefore, been considered desirable to develop a new and improved workpiece feed device for lathes which would overcome the foregoing problems and thereby enhance or improve efficiency of production for an associated lathe.

The subject invention is believed to meet these needs and others and provide a new and improved workpiece feed device which does not require rings or spacers in the lathe spindle, allows quick and easy changeover from one workpiece size to another and which permits bowed workpieces to be processed without first being cut into smaller lengths. As a result, the subject workpiece feed device has been found to offer a worthwhile savings in material and labor costs over those feed devices heretofore known in the art.

BRIEF DESCRIPTION OF THE INVENTION

In accordance with the present invention, a new and improved feed device for a lathe is provided which supports an elongated workpiece at or adjacent the opposite ends thereof. One end of the workpiece is supported by retaining means located in the lathe spindle opening and the other end is retainingly associated with a workpiece pusher. Guide means cooperating with the pusher guide it generally coaxially along a predetermined workpath for selectively advancing the workpiece through the spindle opening. This guide means also allows free rotation of the pusher about its longitudinal axis and does not engage or otherwise interfere with the workpiece itself. As the pusher is moved longitudinally of the workpath from a first position spaced from the spindle toward a second position adjacent the spindle, the pusher enters the spindle opening for rotation therein.

According to the preferred construction, the pusher includes a workpiece receiver defining a somewhat cup-like receiving area dimensioned to receive the rear end area of the workpiece. The receiver and pusher advantageously include interfitting means to accommodate a releasably interconnected relationship therebetween. In the preferred embodiment, the receiver includes a locator member interchangeable with other like members for purposes of accommodating workpieces of different cross-sectional dimensions.

According to a further aspect of the invention, the guide means comprises a plurality of support rollers disposed at spaced intervals to each other generally longitudinally coextensive with the workpath. The preferred arrangement utilizes a plurality of sets of these support rollers laterally spaced apart from each other in a generally surrounding relationship with the workpath. The sets are further spaced apart in a manner for preventing lateral displacement of the pusher from a generally coaxial relationship with the workpath.

The pusher itself has an elongated cylindrical conformation. The rollers in each set are spaced from each other along the workpath in a manner such that the pusher will at all times be supported by a plurality of rollers in each set as it is moved from the first toward the second position.

The principal object of the present invention is the provision of a new and improved elongated workpiece feed device for a lathe.

Another object of the invention is the provision of such a device which is simple in design and operation.

Still another object of the invention is the provision of a workpiece feed device which effectively reduces material and labor costs for sequentially processing an elongated workpiece through a lathe.

A still further object of the invention is the provision of a new and improved feed device which is readily and quickly adapted to use with elongated workpieces having varying cross-sectional dimensions or characteristics.

Still other objects and advantages for the invention will become readily apparent to those skilled in the art upon a reading and understanding of the following specification.

BRIEF DESCRIPTION OF THE DRAWINGS

The invention may take physical form in certain parts and arrangements of parts, a preferred embodiment of which will be described in detail in this specification and illustrated in the accompanying drawings which form a part thereof and wherein:

FIG. 1 is a plan view in partial schematic of the subject new workpiece feed device as it is operatively associated with a lathe spindle;

FIG. 2 is a cross-sectional view taken along lines 2—2 in FIG. 1; and,

FIG. 3 is a side elevational view in partial cross-section showing the preferred relationship between the workpiece pusher and a receiver associated therewith.

DETAILED DESCRIPTION OF THE PREFERRED EMBODIMENT

Referring now to the drawings wherein the showings are for purposes of illustrating the preferred embodiment of the invention only and not for purposes of limiting same, FIG. 1 shows a portion of a lathe or turning machine A having the feed device or apparatus B of the subject invention operatively associated therewith.

More particularly, lathe A includes a cylindrical spindle 10 having a front end or face 12 and a rear end or face 14 which are in an opposed relationship to each other. A spindle opening 16 communicates between ends or faces 12,14 to accommodate sequential feeding of a workpiece therethrough. Spindle 10 is itself rotatably driven about the longitudinal axis of spindle opening 16 and the opening has some predetermined diameter to accommodate workpieces of varying cross-sectional dimensions up to some maximum dimension. The longitudinal axis of spindle opening 16 defines an elongated workpath P extending outwardly from the opening at each of spindle ends or faces 12,14. As is conventional, various machining or turning operations (not shown) are performed on a workpiece adjacent front end or face 12 at a work area generally designated 18. As operation of the lathe or turning machine does not itself comprise a part of the invention, and since such operation is fully known and understood in the art, further explanation thereof is deemed unnecessary to a full and complete understanding of the subject new feed device or apparatus.

With continued reference to FIG. 1, feed device B is operatively associated by convenient connecting means to lathe A adjacent spindle 10 and includes an elongated horizontal frame portion 28 and an elongated vertical frame portion 30. These frame portions are of sufficient length so as to support the remainder of the feed device construction over some predetermined distance from spindle rear end or face 14. A plurality of roller sets 32,34 and 36 define guide means for a workpiece pusher 38 longitudinally along workpath P. A workpiece receiver generally designated 40 in the FIGURE is operatively associated with the forward end of pusher 38 and a pusher drive means 42 operatively communicates with the rear end of the pusher. Retaining means 44 received in spindle opening 16 is adapted to retainingly engage the forward area of an elongated workpiece.

More particularly, and with reference to both of FIGS. 1 and 2, roller sets 32,34 and 36 all have similar constructions except to the extent that roller set 32 is associated with vertical frame portion 30. Each roller set includes an elongated mounting shaft 50 mounted at spaced apart intervals therealong as at pillow or mounting blocks 52,54 and 56. A greater or lesser number of mounting blocks may be used as needed to accommodate the desired lengths of shafts 50. A plurality of rollers or bearings 58 are spaced apart from each other at predetermined intervals along the associated mounting shaft in such fashion that the rollers may rotate about an axis substantially parallel to workpath P. The individual roller sets 32,34 and 36 are laterally spaced apart from each other in such manner and fashion so as to retain workpiece pusher 38 therebetween as will be described. Moreover, the spacing between adjacent ones of rollers 58 in each roller set is such that the pusher side wall will at all times be engaged by a plurality of individual rollers in each set. This then provides pusher stability for reasons which will become more readily apparent hereinafter. The number of individual rollers employed also advantageously increases the workpiece weight supporting capabilities of device B.

Continuing with reference to FIG. 1, workpiece pusher 38 includes an elongated cylindrical body having a length greater than the lateral distance between a plurality of individual rollers 58 in each of roller sets 32,34 and 36. The diameter of this body is at least slightly smaller than the diameter of spindle opening 16 in order that the pusher may be received within the spindle opening during workpiece feeding. Also, the pusher is substantially coaxial with workpath P. As will be seen from FIG. 2, roller sets 32,34 and 36 are spaced apart relative to each other so as to define a retaining relationship for the pusher and thereby limit the amount or degree of pusher displacement laterally of its retained position.

With reference to FIG. 3, the pusher body is designated by numeral 70 and shown as being hollow or having a central bore extending between a workpiece receiving end 72 and a driving end 74. Included at the receiving end is an arrangement to accommodate a releasable, close interfitting relationship between body 70 and receiver 40. In particular, end 72 includes a cylindrical recess 76 coaxial with body 70 and slightly larger in diameter than the pusher body center bore so as to define a radial shoulder at the interface therebetween. A pair of generally opposed radial openings 78 penetrate the side wall of recess 76 for locking cooperation with receiver 40 in a manner to be described.

Receiver 40 is comprised of an end cup member 80 and a locator member 82 which are both generally cylindrical. End cup 80 includes a rear end portion 84 dimensioned for close fitting receipt in pusher recess 76. A pair of generally opposed openings 86 in the rear end portion are adapted to be aligned with openings 78 so that convenient locking pins or the like (not shown) may be received therein to maintain the two components in a desired relative orientation. When assembled, the flange or shoulder area at the interface between rear end portion 84 and a slightly enlarged forward end portion 88 engages pusher end 72. A cylindrical locator member recess 90 is included in forward end portion 88 and tapered opening 92 extends from the bottom wall of recess 90 to the rear face of rear end portion 84.

Locator member 82 includes a mounting end 94 and a workpiece receiving end 96. The mounting end has a diameter which facilitates close receipt in recess 90 and an axial dimension which allows the mounting end rear face to be received against the bottom wall of recess 90. A locating pin arrangement (not shown) somewhat similar to that described above with reference to openings 78,86 is advantageously employed to positively locate locator member 82 in end cup 80. Receiving end 96 includes a workpiece receiving cavity 98 in the front face thereof and is adapted to receive the rearward terminal end area or portion of a workpiece which is to be fed to lathe A by feed device B. Receiving cavity 98 is dimensioned to closely receive the workpiece end and a plurality of like or similar locator members 82 may be advantageously provided to accommodate various workpiece diameters and cross-sectional configurations. The workpiece end is retained in receiving cavity 98 by convenient known means, such as a friction fit or the like, which does not form a part of the present invention. Thus, it is simply necessary to remove one locator member 82 from association with end cup 80 and workpiece pusher 38 and replace it with another receiver whenever it is desired to process a different workpiece size or type. Preferably, the locator member is fixedly secured to the end cup as by, for example, a plurality of threaded fasteners (not shown) disposed circumferentially of and axially between the two components. It will also be appreciated that other specific structural arrangements for receiver 40 may be utilized without in any way departing from the overall intent or scope of the invention.

The other or forward end of the workpiece is retained in spindle opening 16 as by means of retainer 44. In the preferred arrangement shown, this retainer comprises a collet having a head area 100 and a shank or tail area 102. Here too, a range of collet sizes and/or shapes may be advantageously provided to accommodate various workpiece diameters and cross-sectional configurations. The collet acts to fixedly retain the workpiece in the spindle in a known manner and fashion. In addition, other types of retaining means such as a chuck or the like may be satisfactorily substituted for the collet. Such substitution does not, however, in any way depart from the overall intent or scope of the present invention.

Drive means 42 operatively communicates with driving end 74 of workpiece pusher 38 by known means, such as a bearing connection (not shown), to facilitate relative rotation therebetween. While this drive means may comprise any number of alternative arrangements, the preferred embodiment generally contemplates use of a drive cylinder of the hydraulic type. The stroke or drive capability of this drive cylinder is of sufficient length so that the pusher may be moved from the first position shown in FIG. 1 to a second position wherein at least the pusher forward end is received within spindle opening 16. Moreover, drive means 42 includes suitable controls (not shown) which allow selective activation and deactivation thereof so as to effect workpiece feeding in a manner to be described.

Continuing with reference to FIG. 1, the elongated workpiece W includes a forward end area 110 and a rearward end area 112. As shown, workpiece W comprises a hollow cylindrical tube and it will be readily appreciated that other type and styles of elongated workpieces may be accommodated by feed mechanism B. The workpiece is loaded into the lathe and feed mechanism so that forward end area 110 is fixedly retained in spindle opening 16 as by retaining means 44. Rearward end area 112 is, in turn, received by and retained in workpiece receiving cavity 98 of receiver 40 (FIG. 3). It is to be particularly noted that the workpiece is supported over the entirety of its length solely at ends 110, 112.

As the spindle is rotated for permitting some machining or other turning function to be performed as at work area 18 on that portion of the workpiece extending outwardly of spindle front face 12, the workpiece itself is also rotated. This rotation, in turn, extends to workpiece pusher 38 and is readily accommodated as by rollers 58 on roller sets 32, 34 and 36. Since a plurality of rollers 58 in each roller set at all times engage the pusher at spaced intervals along pusher body 70 and further, since the roller sets are positioned relative to each other so as to prevent lateral displacement of the pusher relative to workpath P, pusher 38 is retained in an extremely stable position relative to and substantially coaxial with the workpath. This result is extremely desirable when the workpiece is slightly bowed over its length between the opposed ends thereof.

When it is desired to sequentially advance workpiece W along workpath P so that another portion thereof communicates with work area 18, the retaining engagement provided by retaining means 44 is released in a conventional manner and the pusher advanced some predetermined distance along the workpath toward spindle 10 by selective actuation of drive means 42. Once the workpiece has been advanced by the desired amount, retaining means 44 may again be moved to its retaining condition with regard to the new or displaced workpiece forward end area 110 and the next cutting or turning operation performed as at work area 18.

Such sequential advancement of workpiece W along workpath P is continued until pusher 38 has been longitudinally advanced to a second position immediately adjacent rear end or face 14 of spindle 10. Thereafter, and because of the foregoing dimensional relationships between the diameters of opening 16 and pusher body 70, the pusher may be moved directly into the spindle opening. At that juncture, the pusher is entirely supported in the spindle opening and no longer receives any support from rollers 58 of roller sets 32, 34 and 36. Once the entirety of workpiece W has been processed through lathe A in the manner just described, workpiece pusher may be moved back to its first position as shown in FIG. 1 by drive means 42, a new workpiece W inserted into the lathe and feed mechanism with the workpiece feeding process then repeated as described.

The subject feed mechanism has several particularly advantageous features. First, the workpiece itself is not in any way contacted by the feed mechanism or spindle except at or adjacent the opposed ends thereof. The feed mechanism does not require any liners or spacers in the lathe head or spindle since workpiece pusher 38 fully supports the workpiece once it has been processed to a length where the pusher is received by spindle opening 16. Also, the subject new feed device reduces so-called tail end whip caused by bowed workpieces. That is, in the subject device, workpiece W is retained or supported at the opposed ends so that any bow would be located intermediate thereof. Any bow located at generally the workpiece central area reduces tail whip whereas other, prior devices which restrict the workpiece at only one end cause exaggerated tail whip. Such exaggerated tail whip oftentimes necessitates sawing the workpiece into shorter lengths for avoiding damage to the feed mechanism or lathe during turning or machining operations.

The invention has been described with reference to the preferred embodiment. Obviously, modifications and alterations wll occur to others upon the reading and understanding of this specification. It is intended to include all such modifications and alterations insofar as they come within the scope of the appended claims or the equivalents thereof.

Having thus described the invention, it is now claimed:

1. A feeding device for selectively advancing an elongated workpiece longitudinally through an opening in the spindle of a lathe from a spindle rear end outwardly of a spindle front end whereby a plurality of turning operations may be performed at spaced intervals along the workpiece adjacent the spindle front end as said workpiece is sequentially advanced through the spindle opening, said device comprising:

means adapted for retaining the front end of an elongated workpiece in the spindle opening of an associated lathe in a manner such that the workpiece is in a non-contacting relationship with the opening side wall; a workpiece pusher adapted to be disposed adjacent the rear end of the spindle in a generally coaxial relationship with the spindle opening; means for moving said pusher linearly toward the spindle for selectively advancing the workpiece through the spindle opening along an elongated workpath generally coaxial with the spindle opening; means associated with said pusher adapted for supporting the rear end of the workpiece; and, means for guiding said pusher linearly along said workpath while allowing rotation of said pusher generally about its axis, said guide means being in a non-contacting relationship with the elongated workpiece and comprising a plurality of roller sets stationarily disposed longitudinally of said workpath over a major extent of the linear movement experienced by said pusher with each roller set including a plurality of separate rollers journalled for rotation at least about an axis substantially parallel to said workpath, the individual rollers in each set being spaced apart from each other a predetermined distance longitudinally of said workpath and the rollers of said plurality of sets being disposed in a predetermined radially spaced relationship from said workpath to confine said pusher for preventing lateral displacement thereof generally from said workpath.

2. The feeding device as defined in claim 1 wherein said retaining means comprises a collet received in the spindle opening of an associated lathe adapted to closely embrace an elongated workpiece adjacent the front end thereof.

3. The feeding device as defined in claim 1 wherein the individual rollers of said roller sets are spaced apart from each other in a manner such that said pusher is at all times engaged by at least a pair of rollers in each roller set.

4. The feeding device as defined in claim 3 wherein the rollers of each set are mounted along a common axis and disposed at substantially identical locations along said axis as the rollers of the other roller sets.

5. The feeding device as defined in claim 1 wherein said pusher has a cylindrical conformation with the outside diameter thereof being at least slightly smaller than the diameter of the spindle opening in an associated lathe, whereby said pusher is adapted to be received in the spindle opening as the rear end area of an elongated workpiece is advanced through the spindle opening.

6. The feeding device as defined in claim 1 wherein said roller sets are disposed in a generally surrounding relationship with said workpath with the arcuate distance between adjacent roller sets being less than 180°.

7. A workpiece feed mechanism for a lathe comprising in combination:

a lathe having a rotatably driven spindle including a workpiece feed opening defining a workpath extending therethrough between spindle front and rear ends with said opening being coaxial with the axis of spindle rotation;

a feed mechanism operatively associated with said lathe for selectively feeding an elongated workpiece along said workpath through said opening from said spindle rear end outwardly of said front end for machining in some predetermined manner by said lathe, said feed mechanism including: means associated with said spindle adapted to retain the forward end area of an elongated workpiece in said spindle opening in a non-contacting relationship with the side wall thereof; a workpiece pusher generally coaxial with said workpath and linearly movable therealong between a first position spaced outwardly of said spindle rear end to a second position at least closely spaced adjacent thereto, said pusher including support means adapted to supportingly engage the rearward end area of an elongated workpiece for selectively advancing the workpiece along said workpath; and, means for guiding said pusher along said workpath between said first and second positions while allowing rotation of said pusher abouts its axis generally coaxial with said workpath, said guide means comprising a plurality of roller sets stationarily disposed longitudinally of said workpath over a majority of the extent of linear travel of said pusher with each roller set including a plurality of separate rollers journalled for rotation at least about an axis substantially parallel to said workpath, the individual rollers in each set being spaced apart from each other a predetermined distance longitudinally of said workpath and the rollers of said plurality sets being disposed in a predetermined radially spaced relationship from said workpath to confine said pusher for preventing lateral displacement thereof generally from said workpath.

8. The combination as defined in claim 7 wherein the individual rollers in said roller sets are spaced apart from each other in a manner such that said pusher is at all times engaged by at least a pair of rollers in each roller set.

* * * * *